(12) United States Patent
Truong et al.

(10) Patent No.: US 9,477,521 B2
(45) Date of Patent: Oct. 25, 2016

(54) METHOD AND SYSTEM FOR SCHEDULING REPETITIVE TASKS IN O(1)

(71) Applicant: NetApp, Inc., Sunnyvale, CA (US)

(72) Inventors: Dan Truong, Sunnvale, CA (US); Alexander Sideropoulos, Sunnyvale, CA (US); Michael Cao, Sunnyvale, CA (US); Raymond Luk, Sunnyvale, CA (US); Darren Sawyer, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 229 days.

(21) Appl. No.: 14/290,751

(22) Filed: May 29, 2014

(65) Prior Publication Data

US 2015/0347186 A1 Dec. 3, 2015

(51) Int. Cl.
*G06F 9/48* (2006.01)

(52) U.S. Cl.
CPC .......... *G06F 9/4881* (2013.01); *G06F 9/4887* (2013.01)

(58) Field of Classification Search
None
See application file for complete search history.

(56) References Cited

U.S. PATENT DOCUMENTS

| | | | |
|---|---|---|---|
| 6,542,921 B1 | 4/2003 | Sager | |
| 6,883,171 B1 * | 4/2005 | Bittner, Jr. | G06F 13/4027 711/220 |
| 8,127,303 B2 | 2/2012 | Kukanov et al. | |
| 8,185,895 B2 | 5/2012 | Ko et al. | |
| 8,196,147 B1 | 6/2012 | Srinivasan et al. | |
| 8,234,250 B1 | 7/2012 | Sharma et al. | |
| 8,245,207 B1 | 8/2012 | English et al. | |
| 8,621,184 B1 | 12/2013 | Radhakrishnan et al. | |
| 8,910,171 B2 | 12/2014 | Mital et al. | |
| 8,954,986 B2 | 2/2015 | Rajagopalan et al. | |
| 2002/0199069 A1 | 12/2002 | Joseph | |
| 2003/0140085 A1 | 7/2003 | Moir et al. | |
| 2003/0204551 A1 * | 10/2003 | Chen | G06F 9/5016 718/102 |

(Continued)

FOREIGN PATENT DOCUMENTS

GB 2492653 1/2013

OTHER PUBLICATIONS

Al Kelley et al., A Book on C, 1998, Addison-Wesley Professional, 4th ed, p. 246.*
Non-Final Office Action on co-pending U.S. Appl. No. 14/290,763 dated Sep. 9, 2015.
vanDooren; "Creating a thread safe producer consumer queue in C++ without using locks"; C++ Programming on Cloud 9, Jan. 5, 2007; blogs.msmvps.com/vandooren/2007/01/05/creating-a-thread-safe-producer-consumer-queue-in-c-without-using-locks/ on Sep. 3, 2015.

(Continued)

*Primary Examiner* — Emerson Puente
*Assistant Examiner* — Zhi Chen
(74) *Attorney, Agent, or Firm* — Klein, O'Neill & Singh, LLP

(57) ABSTRACT

Systems and methods are disclosed for scheduling a plurality of tasks for execution on one or more processors. An example method includes obtaining a counter value of a counter. The method also includes for each work queue of a plurality of work queues, identifying an execution period of the respective work queue and comparing a counter value to an execution period of the respective work queue. Each work queue includes a set of tasks and is defined by an execution period at which to run the respective set of queued tasks. The method further includes selecting, based on the comparing, a subset of the plurality of work queues. The method also includes scheduling a set of tasks of slower frequency queued in a selected work queue for execution on one or more processors before a set of tasks queued in a non-selected work queue. The work items may be scheduled in O(1) because the design inherently prioritizes the tasks based on the urgency of their completion, and may do so by resetting a work queue pointer.

20 Claims, 11 Drawing Sheets

(56) References Cited

U.S. PATENT DOCUMENTS

| | | |
|---|---|---|
| 2003/0233392 A1 | 12/2003 | Forin et al. |
| 2004/0154020 A1 | 8/2004 | Chen et al. |
| 2005/0071155 A1* | 3/2005 | Etter .................. G10L 21/02 704/225 |
| 2007/0169123 A1 | 7/2007 | Hopkins |
| 2008/0034190 A1 | 2/2008 | Rodgers et al. |
| 2008/0062927 A1 | 3/2008 | Zhu et al. |
| 2009/0031319 A1* | 1/2009 | Fecioru .............. G06F 9/4881 718/103 |
| 2010/0095305 A1 | 4/2010 | Akizuki |
| 2013/0191852 A1 | 7/2013 | Howes et al. |
| 2013/0198760 A1 | 8/2013 | Cuadra et al. |
| 2013/0305258 A1 | 11/2013 | Durant |
| 2014/0068232 A1 | 3/2014 | Wang et al. |
| 2014/0229953 A1 | 8/2014 | Sevastiyanov et al. |
| 2014/0237474 A1 | 8/2014 | Branton |
| 2015/0205646 A1 | 7/2015 | Singh |

OTHER PUBLICATIONS

Wikipedia; "Non-blocking algorithm"; http://en.wikipedia.org/wiki/Non-blocking_algorithm; May 21, 2014; 5 pages.

Wikipedia; "Timestamp-based concurrency control"; http://en.wikipedia.org/wiki/Timestamp-based_concurrency_control; May 21, 2014; 4 pages.

Wikipedia, "Non-Blocking Algorithm", http://en.wikipedia.org/wiki/Non-blocking_algorithm, May 21, 2014, 5 pgs.

Wikipedia, "Timestamp-Based Concurrency Control", http://en.wikipedia.org/wiki/Timestamp-based_concurrency_control, May 21, 2014, 4 pgs.

Notice of Allowance on co-pending U.S. Appl. No. 14/290,763 dated Dec. 3, 2015.

Notice of Allowance on co-pending U.S. Appl. No. 14/290,313 dated Jan. 15, 2016.

* cited by examiner

METHOD AND SYSTEM FOR SCHEDULING REPETITIVE TASKS IN O(1)

BACKGROUND

The present disclosure generally relates to computing devices, and more particularly to scheduling tasks for execution on one or more processors.

An operating system serves as an intermediary layer between the hardware and software (e.g., an application). An operating system may also schedule tasks for efficient use of system resources and may implement different scheduling policies to determine which tasks to schedule in a work queue for execution on a processor.

In an example, an operating system may implement a first-come first service scheduling policy in which a thread that arrives before another thread is executed before the other thread. The first-come first service scheduling policy, however, has some disadvantages. For example, the first-come first service scheduling policy may yield some long wait times, particularly if the first thread to arrive in a work queue takes a long time. Additionally, although the thread that arrives later may be more urgent, the later arriving thread is executed after the threads on a first-come basis.

In another example, an operating system may implement a round-robin scheduling policy in which a pool of threads take turn executing for a specified period of time. The round-robin scheduling policy, however, has some disadvantages. For example, threads in the pool may have different priorities and one thread may take substantially longer to execute compared to another thread that has a short execution time. Scheduling policies are typically complex to avoid such shortcomings, and implement complex heuristics to prioritize work threads.

Figure 1:
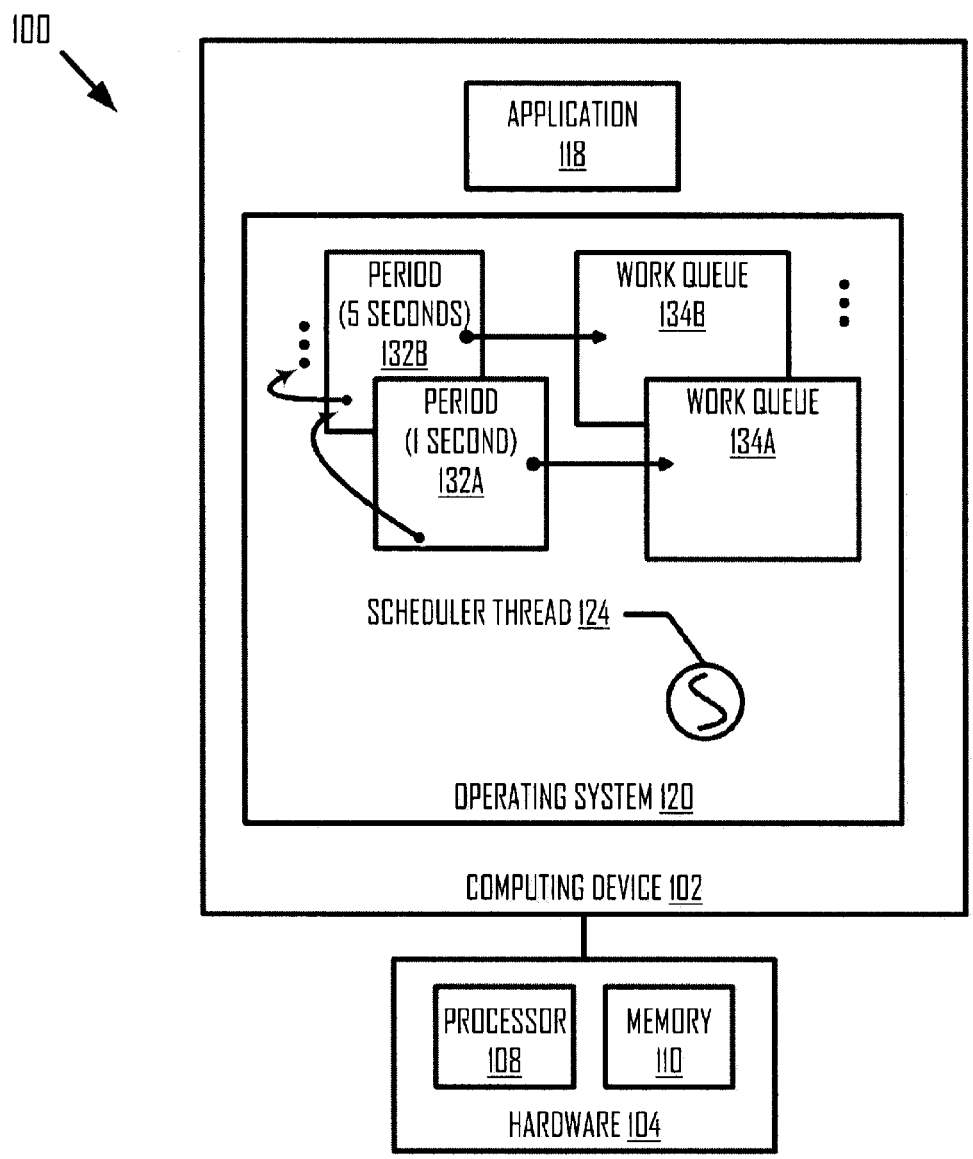
FIG. 1 is a block diagram illustrating a system for scheduling a plurality of tasks for execution on one or more processors, according to an embodiment.

Embodiments of the present disclosure and their advantages are best understood by referring to the detailed description that follows. The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the leftmost digit in the corresponding reference number.

DETAILED DESCRIPTION

I. Overview
II. Example System Architecture
III. Example Block Execution Diagrams and Timing Diagrams
   A. Period Nodes
   B. Work Queues
   C. Select One or More Work Queues to Process
   D. Schedule the Tasks Queued in the One or more Selected Work Queues
   E. Execute the Scheduled Tasks
IV. Flexibility
   A. Raise an Error
   B. Flexible Traversals
   C. Period Node and Work Queue Implementations
V. Example Method
VI. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

An operating system may determine whether and when to schedule tasks. In an embodiment of the disclosure, period list nodes may have an execution frequency that references a work queue that is also defined by the same execution frequency. The period nodes are ordered in such a way that prioritizes tasks based on their execution frequencies. For example, a plurality of period nodes in a linked list is ordered in ascending order from shortest execution period to longest execution period. Each period node may reference a work queue that is defined by an execution frequency at which to run the respective set of queued tasks.

As noted above, a period node having a particular execution frequency may reference a work queue that is defined by the same execution frequency. Tasks are inserted into different work queues based on the execution frequency assigned to the task. For example, a work queue may have an execution period of one second (or an execution frequency of one Hertz), and each task queued in the work queue is assigned an execution period of one second. A scheduler thread may schedule tasks queued in a particular work queue for a given period for execution on one or more processors in a timely manner and in such a way that tasks that are assigned shorter execution periods than others are executed with a higher priority. In an example, a task with a higher priority than another task is executed before the other task. For example, a worker thread may traverse period nodes in the linked list and determine whether to process tasks queued in a work queue referenced by the traversed period node. Using the techniques provided in the disclosure, it may be unnecessary to implement complex scheduling routines because the period nodes in the linked list have an order to them ensuring that tasks that are assigned a lower execution frequency may be prioritized over tasks that are assigned a higher execution frequency. Furthermore re-scheduling the repetitive tasks does not necessitate rebuilding a work queue every time. In an example, re-scheduling the repetitive tasks may be done by resetting the work queue for the given period node. Accordingly, the ordering of the tasks is built into the period nodes and their arrangement in the linked list.

In an example, when a work queue is initially set up, a work queue pointer in a period node may reference a null value in the work queue. In response to determining that a work queue is to be processed, the scheduler thread may reset the work queue pointer to reference a beginning task in the work queue such that processing starts from the referenced task, as will be explained in further detail below. As such, the scheduler thread may prioritize and schedule tasks in O(1) time. In mathematics, big O notation describes the limiting behavior of a function when the argument tends towards a particular value or infinity, usually in terms of simpler functions. The notation O(1) describes an algorithm that executes in a time (or space) that is independent of the size of the input data set.

In an example, a queued task may be an API call into a subsystem (e.g., network interface card, processor, disk, and storage volume, etc.) that causes the return of the subsystem's performance statistics and metrics. A subsystem may run and accrue values and counters that may be monitored to determine the performance of the subsystem and may expose a function that returns the one or more performance statistics requested. In an example, the subsystem is a storage volume, and the performance data for the storage volume may include any of a variety of data tracked by the system that has an informational value with respect to how the storage volume has performed. Examples include software counters at the physical storage drives that describe time taken to fetch data, software counters that track errors at network connections, and the like. A worker thread may retrieve a task from the work queue and invoke an API at the storage volume and receive the storage volume's performance data.

Additionally, it may be unnecessary to insert tasks one by one or have complex policies. As soon as a work queue is reset (e.g., via modifying a work queue pointer), it may be automatically prioritized properly by the position of the period node in the linked list. The scheduling of work is more resilient to memory corruptions. For example, if tasks performed regularly do not spawn and end frequently, their work queue entries are allocated once and reused. Additionally, by resetting the pointer to the beginning task in a work queue, the processing of tasks queued in a work queue may be repeated, resulting in O(1) scheduling. In an example, a task is an invocation of a worker thread performing some amount of computation. The scheduler may retrieve a task from a work queue and modify the pointer to reference the next task to be retrieved and processed next. If and when the work queue of a period is NULL, the scheduler jumps to the next period to process a new work queue. An execution period and a period may be used interchangeably in the present disclosure.

Various embodiments of the present disclosure provide for techniques of scheduling repetitive tasks by modifying a work queue pointer, rather than allocating and freeing memory.

II. Example System Architecture

FIG. 1 is a block diagram 100 illustrating a system for scheduling a plurality of tasks for execution on one or more processors, according to an embodiment. Diagram 100 includes a computing device 102 coupled to hardware 104. Computing device 102 may be any computing device, such as a rackmount server, a workstation, a desktop computer, a notebook computer, a tablet computer, a game console, a mobile phone, a palm-sized computing device, a personal digital assistant (PDA), etc.

The principles described below may be applied to any of a variety of computing systems. For instance, in one embodiment computing device 102 includes a server running an operating system, such as the LINUX® operating system. In another embodiment, computing device 102 includes a network storage controller, which implements virtual storage on a multitude of physical storage drives and runs a storage operating system, such as the DATAON-TAP™ operating system, available from NetApp, Inc. Trademarks are the property of their respective owners.

Hardware 104 includes one or more processors 108 and a memory 110. Hardware 104 may also include other hardware devices or different hardware devices than that shown in FIG. 1. A bus may couple one or more processors 108 to memory 110. The term "processor" generally refers to a single processor core. A processor may be a processor core of a microprocessor, central processing unit (CPU), or the like. Some processors may be different processing cores of a processing device that includes a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

Computing device 102 includes an operating system 120 that serves as an intermediary layer between the hardware and software (e.g., an application 118). An application 118 generally refers to a software application or a computer program of any type, including a system process, desktop application, web application, application run in a web browser, etc. In an example, an application 118 includes one or more processes, threads, and/or tasks executed by one or more processors 108. Operating system 120 provides a software layer to manage the limited resources of computing device 102. For example, operating system 120 manages and allocates computer resources (e.g., processor 108, memory 110, and peripherals) between various system processes while at the same time ensuring system integrity. At any one instance, multiple programs may be executing or may be waiting to be executed on a processor. Computing device 102 may have a limited quantity of processors and memory 110, and operating system 120 may decide which programs get access to which processor, for how long, and when.

The term "process" generally refers to an instance of a computer program that is executed. A process may include multiple threads that execute instructions concurrently. The term "thread" generally refers to a collection of program instructions or tasks that may be executed independently. Multiple threads may exist within the same process and share resources, such as memory. The term "task" generally refers to one or more instructions that are executed. A task may be a minimal execution context and contain task-specific context or state. For example, a task may be a work item that is defined and scheduled by operating system 120 for execution on processor 108. In such an example, the task may be a function with one or more parameters that can be called or invoked. In this disclosure "tasks" are generally used in examples for consistency. However, the scope of this disclosure is not limited to "tasks" per se and further applies to application 118, processes, threads, and other executable units having access to memory in computer systems.

Operating system 120 implements a scheduling policy and schedules tasks for execution on one or more processors 108. The present disclosure discloses an efficient scheduling policy that does not incur significant run-time overhead and is resilient to risks of memory corruption by avoiding unnecessary memory allocations and manipulations. In FIG. 1, operating system 120 includes a scheduler thread 124 that performs calculations to assist it in determining whether to schedule a task for execution on a processor. Scheduler thread 124 may track non-preemptive repetitive tasks that have a finite duration before they go back to sleep, and the tasks may have an unknown wall clock runtime. Scheduler thread 124 may respect scheduling deadlines so that the repetitive tasks are scheduled and executed in accordance with their assigned execution frequencies without being delayed past their assigned execution frequencies.

Operating system 120 includes a plurality of period nodes 132 and a plurality of work queues 134. A work queue includes a set of tasks, and each period node references a work queue. A set of tasks may include zero or more tasks. A period node and a work queue may be implemented using a data structure. In an example, the plurality of period nodes and/or a work queue is implemented using a linked list. In another example where the tasks are mostly immutable, the plurality of period nodes and/or a work queue is implemented using an array.

Computing device 102 may perform work at different frequencies. A task is assigned a repetitive execution period, which indicates how often the task should execute. In an example, a user assigns an execution frequency to a task. Each task may have an execution priority that is based on the execution frequency assigned to the respective task. Scheduler thread 124 may prioritize work based on how urgent it is. For example, the user may assign an execution period of one second to a first task and assign an execution period of five seconds to a second task. In such an example, the first task, which has a shorter execution period than the second task, may have a higher priority than the second task and may execute before the second task so that less than one second elapses before it is run. Accordingly, scheduler thread 124 may schedule the first task before the second task to execute on processor 108. The execution frequency or execution period is user configurable.

Some work may need to happen very fast (e.g., every one second), and some work may need to happen more slowly (e.g., every five minutes). Scheduler thread 124 prioritizes work so that tasks are scheduled in time according to their assigned execution frequencies. For example, scheduler thread 124 orders the tasks so that they complete within their assigned execution frequencies.

A work queue may correspond to how frequently a task should execute. For example, each work queue is defined by an execution frequency at which to run the set of tasks queued in the work queue. Additionally, scheduler thread 124 manages a plurality of period nodes that includes a period node for each different execution frequency corresponding to a work queue. A period node may have a period, which corresponds to an execution frequency at which a task that is queued in a work queue referenced by the period node is to be executed. In the example illustrated in FIG. 1, the plurality of period nodes includes a period node 132A and period node 132B. A period node defines an execution frequency at which to run a task queued in a work queue that is referenced by the period node.

Period node 132A has an execution period of one second (or an execution frequency of 0.1 Hertz) and thus references a work queue that is defined by an execution period of one second (or an execution frequency of 0.1 Hertz). Accordingly, a set of tasks queued in work queue 134A is executed once within a one-second window. Similarly, period node 132B has an execution period of five seconds and thus references a work queue that is defined by an execution period of five seconds. Accordingly, a set of tasks queued in work queue 134B is executed once within a five-second window. As such, scheduler thread 124 schedules the set of tasks queued in work queue 134A to execute once every second and schedules the set of tasks queued in work queue 134B to execute once every five seconds. These are merely examples of execution periods. In other examples, a task may be assigned 1, 5, 10, or 30-second execution periods, 1, 6, or 12-hour execution periods, one-day or one-week execution periods.

Operating system 120 may insert a task into the appropriate work queue. In an example, for each task of a plurality of tasks, operating system 120 may identify an execution frequency assigned to the respective task, identify a work queue of the plurality of work queues that matches the execution frequency assigned to the respective task, and queue the respective task in the identified work queue. If a work queue is defined by an execution frequency that is the same execution frequency assigned to a task, the work queue matches the task. In an example, if a task is assigned an execution frequency of N, operating system 120 inserts the task into a work queue that is defined by an execution frequency of N. In another example, a given task is assigned an execution frequency of one hertz, and work queue 134A is referenced by period node 132A, which has an execution frequency that matches the execution frequency assigned to the given task. In such an example, operating system 120 inserts the given task into work queue 134A.

Work queues 134A and 134B may be allocated separately and may be allocated once when the work that needs to be done is defined. It may be unnecessary to modify the work queues (unless a task queued in a work queue is to be added or removed). By only having to reset the pointer to repeat the processing of tasks queued in a work queue, the scheduling work is resilient to memory corruptions. For example, tasks are allocated once, and reused by resetting the memory address to which a work queue pointer references to the first task of the work queue. In a period node, the work queue pointer may be the only data that is updated. Accordingly, the period nodes may be mostly read-only and the memory that is used is old, long lasting allocations. Accordingly, it may be less likely that recently allocated corrupted structures are co-located. Furthermore, re-scheduling the tasks at the end of a period is done in O(1).

III. Example Block Execution Diagrams and Timing Diagrams

FIGS. 2A-2E are block diagrams of a worker thread processing a plurality of scheduled tasks, according to an embodiment. FIGS. 3A-3D are timing diagrams for worker thread 222 corresponding to the execution of the plurality of scheduled tasks, according to an embodiment. The timing diagrams in FIGS. 3A-3D show the activity after scheduler thread 124 has woken up seven times. Every second that scheduler thread 124 awakens, scheduler thread 124 may reset work queue 134A. Every five seconds that scheduler thread 124 awakens, (e.g., times "0:00:05" and "0:00:10"), scheduler thread 124 resets work queue 134B. The description below refers to FIGS. 2A-2E and FIGS. 3A-3D together to explain in further detail how scheduler thread 124 schedules the plurality of tasks for execution on one or more processors 108.

A. Period Nodes

Scheduler thread 124 tracks each scheduling period via a period node, where a scheduling period refers to an execution frequency. In the example illustrated in FIG. 2A, the plurality of period nodes is implemented using a linked list 204 including one or more elements.

Scheduler thread 124 references a beginning element in linked list 204. The beginning element in linked list 204 includes period node 132A, which references a next element 132B in linked list 204. Node 132A also references a work queue 134A. In an example, period node 132A is a structure called "period" in the C or C++ programming language, and the structure has a field holding the period that has a value of 1 (for one second), a pointer to a structure of the same type (e.g., period node 132B), and a pointer to a work queue (e.g., work queue 134A). A pointer to a work queue may be referred to as a work queue pointer and is associated with the work queue to which the pointer references. Period node 132A includes a work queue pointer 218 that references and is associated with work queue 134A and a pointer to the first task 206 of the work queue 134A (pointer is not shown) which allows resetting the work queue pointer 218 to the beginning of the first task. After period node 132A, the next and second element in linked list 204 includes period node 132B, which includes a work queue pointer 220 that references and is associated with work queue 134B.

The period nodes are ordered in linked list 204 in such a way that prioritizes tasks based on their execution frequencies. For example, the plurality of period nodes in linked list 204 is ordered in ascending order from fastest execution frequency to the slowest execution frequency. In this way, it may be unnecessary to implement complex scheduling routines because the period nodes in linked list 204 may have an order to them ensuring that tasks that are assigned a faster execution frequency may be prioritized over tasks that are assigned a slower execution frequency. The ordering of the tasks is built into the period nodes arrangement in linked list 204. For example, an execution period of one second is faster than an execution period of five seconds. Accordingly, period node 132A, which has an execution period of one second, is in a preceding location in linked list 204 compared to period node 132B's location. Although linked list 204 is illustrated as including two elements, this is not intended to be limiting and linked list 204 may include two or more elements. It should be understood that linked list 204 may have as many elements as there are different execution frequencies to implement.

A period node includes an execution frequency and references a work queue that is defined by the execution frequency. For example, period node 132A has a period of one second and references work queue 134A, which is defined by a one-second execution period. Accordingly, each of the tasks queued in work queue 134A is assigned an execution period of one second, and scheduler thread 124 schedules the set of tasks queued in work queue 134A to execute once every second. Similarly, period node 132B has a period of five seconds and references work queue 134B, which is defined by a five-second execution period. Accordingly, each of the tasks queued in work queue 134B is assigned an execution period of five seconds, and scheduler thread 124 schedules the set of tasks queued in work queue 134B to execute once every five seconds.

B. Work Queues

Scheduler thread 124 manages separate work queues for each scheduling period. Work queue 134A includes a first ordered set of tasks and is implemented using a first linked list including elements 206, 208, and 210. Element 206 is a beginning element in the first linked list, includes task "1", and references a next element 208. Element 208 includes task "2" and references a next element 210. Element 210 is a null value and is the last element in the first linked list. Similarly, work queue 134B includes a second ordered set of tasks and is implemented using a second linked list including elements 212 and 214. Element 212 is a beginning element in the second linked list, includes task "3", and references a next element 214. Element 214 is a null value and is the last element in the second linked list.

In an embodiment, when a work queue is initially set up scheduler thread 124 sets the work queue pointer associated with the work queue to reference a null value. If worker thread 222 traverses a work queue and its work queue pointer references the null value, worker thread 222 may skip processing of the work queue and go to the next period node to traverse the next work queue in accordance with the order of linked list 204. When scheduler thread 124 selects a work queue for processing, scheduler thread 124 may reset the work queue pointer to reference a beginning element in the selected work queue. As such, if worker thread 222 traverses a work queue and its work queue pointer does not reference the null value, worker thread 222 may grab a work queue task and advance the work queue pointer. Worker threads then traverse the next work queue of the next period once a work queue points to a null entry in accordance with the order of linked list 204. Accordingly, worker threads may determine what tasks to process by traversing the period node/work queue structures.

Additionally, the tasks queued in the work queues may be repetitive tasks. When scheduler thread 124 resets a work queue pointer to reference the beginning element in a work queue, scheduler thread 124 schedules these repetitive tasks with O(1) cost. Moreover, it may be unnecessary to implement complex routines with high rates of memory access and data movement. Another alternative solution example would be to manage one work queue and dynamically add tasks to it as they need to be scheduled. This may not work well as the one-second tasks might be scheduled after all the five-second tasks, which may prevent the one-second tasks from running within the allotted one-second time frame C. Select One or More Work Queues to Process After a time period, scheduler thread 124 may awaken and select one or more work queues of the plurality of work queues to reset. In an example, scheduler thread 124 awakens every second. In such an example, scheduler thread 124 may wake up and reset chosen period work queues up to every second. This is merely an example, and the time period in which scheduler thread 124 sleeps and awakens may vary.

In an embodiment, scheduler thread 124 awakens and obtains a counter value 202 of a timer. The timer may be any type of counter that modifies the counter value. In an example, the counter is a hardware resource that is clocked at a particular rate and is read by the software to establish the amount of time that has passed. In another example, the counter is a hardware resource that generates an interrupt to processor 108 at a periodic rate. Operating system 120 may be capable of measuring time and time differences at various points. For example, operating system 120 may provide time of day services, which is the real-world date and time of the platform. In an embodiment, the counter used may be the counter tracking the time since last reboot of the system.

For each work queue of the plurality of work queues, scheduler thread 124 may identify an execution frequency of the respective work queue and compare the obtained counter value to the execution frequency of the respective work queue. In an example, scheduler thread 124 compares the counter value to the execution frequency by applying an operation that has the counter value and the execution frequency of the respective work queue as operands. Scheduler thread 124 selects, based on the comparison, a subset of the plurality of work queues and resets them to-replicate-schedule their set of tasks queued in their work queues. Henceforth, the tasks may be scheduled before a set of tasks queued in a non-selected work queue for execution on one or more processors 108, solely based on their period. This ensures prioritization of faster frequency tasks first.

For each work queue of the plurality of work queues, scheduler thread 124 may apply the operation and determine a result of applying the operation. In an example, the operation is the modulo operation and has the counter value and execution period of the respective work queue as operands. For each work queue, scheduler thread 124 may apply the modulo operation and compute a result of (counter value) modulo (the execution period of the respective work queue).

Table A below indicates a table of results based on applying the modulo operation for work queue 134A, which has an execution period of one second:

| Counter Value | Result of (counter value) modulo (one second) | Reset pointer? |
|---|---|---|
| 0:00:01 | (0:00:01) modulo (1) = 0 | Y |
| 0:00:02 | (0:00:02) modulo (1) = 0 | Y |
| 0:00:03 | (0:00:03) modulo (1) = 0 | Y |
| 0:00:04 | (0:00:04) modulo (1) = 0 | Y |
| 0:00:05 | (0:00:05) modulo (1) = 0 | Y |

In Table A, the counter value may be the time since boot, and when scheduler thread 124 awakens it checks the time since boot. As illustrated in the first row of Table A, scheduler thread 124 awakens at time "0:00:01", and computes a result of (0:00:01) modulo (execution period of work queue 134A), where the result is 0. Scheduler thread 124 may awaken at times "0:00:02", "0:00:03", "0:00:04", and "0:00:05", and apply the modulo operation having the current counter value and execution period of work queue 134A as operands to obtain the results displayed in Table A.

Table B below indicates a table of results based on applying the modulo operation for work queue 134B, which has an execution period of five seconds:

| Counter Value | Result of (counter value) modulo (five seconds) | Reset pointer? |
|---|---|---|
| 0:00:01 | (0:00:01) modulo (5) = 1 | N |
| 0:00:02 | (0:00:02) modulo (5) = 2 | N |
| 0:00:03 | (0:00:03) modulo (5) = 3 | N |
| 0:00:04 | (0:00:04) modulo (5) = 4 | N |
| 0:00:05 | (0:00:05) modulo (5) = 0 | Y |

In Table B, the counter value may be the time of day, and when scheduler thread 124 awakens it checks the time of day. As illustrated in the first row of Table B, scheduler thread 124 awakens at times "0:00:01", and computes a result of (0:00:01) modulo (execution period of work queue 134B), where the result is 1. Scheduler thread 124 may awaken at times "0:00:02", "0:00:03", "0:00:04", and "0:00:05", and apply the modulo operation having the current counter value and the execution period of work queue 134B as operands to obtain the results displayed in Table B.

After scheduler thread 124 awakens and compares the obtained counter value to the execution period of each work queue of the plurality of work queues, scheduler thread 124 may select, based on the comparison, a subset of the plurality of work queues. Scheduler thread 124 may select a work queue based on the result associated with the work queue. In an example, if the result of the operation having a given execution period as an operand is a given value then the set of tasks queued in the work queue defined by the given execution period is scheduled to be executed in accordance with the execution period.

In an example, the given value is zero, and the operation is the modulo operation. In reference to Table A and work queue 134A, the result of applying the modulo operation with the execution period of one second and each of the obtained current values "0:00:01", "0:00:02", "0:00:03", "0:00:04", and "0:00:05" as operands is zero. Accordingly, when obtained current value 202 is "0:00:01", "0:00:02", "0:00:03", "0:00:04", and "0:00:05", scheduler thread 124 selects work queue 134A and resets work queue pointer 218 to reference beginning element 206.

In reference to Table B and work queue 134B, the result of applying the modulo operation with the execution period of five seconds and each of the obtained current values "0:00:01", "0:00:02", "0:00:03", and "0:00:04" as operands is not zero. Accordingly, when obtained current value 202 is "0:00:01", "0:00:02", "0:00:03", and "0:00:04", scheduler thread 124 does not select work queue 134A and thus does not reset work queue pointer 220 to reference beginning element 212. In contrast, the result of applying the modulo operation with the execution period of five seconds and obtained current value "0:00:05" as operands is zero. Accordingly, when obtained current value 202 is "0:00:05", scheduler thread 124 selects work queue 134B and resets work queue pointer 220 to reference beginning element 212.

Figure 3A:
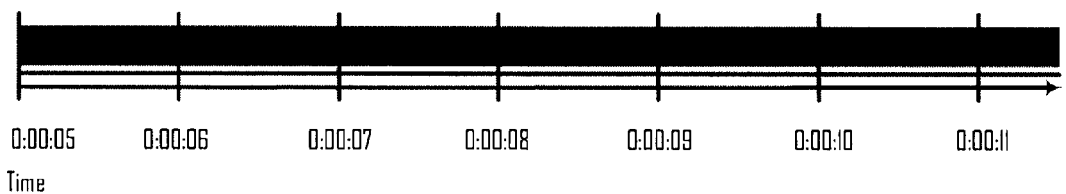
FIGS. 3A-3D are timing diagrams for the worker thread corresponding to the execution of the plurality of scheduled tasks, according to an embodiment.

FIG. 3A is a timing diagram for worker thread 222 corresponding to a counter value before "0:00:05" (e.g., time "0:00:05") and shows the activities of scheduler thread 124 before it awakens at time "0:00:05". In FIG. 3A, scheduler thread 124 has not scheduled any tasks to be executed yet for the time period of "0:00:05" to "0:00:11".

D. Schedule the Tasks Queued in the One or More Selected Work Queues

Scheduler thread 124 schedules the set of tasks queued in the one or more selected work queues for processing on one or more processors 108. When a work queue is initially set up scheduler thread 124 may set the work queue pointer associated with the work queue to reference a null value. As such, when scheduler thread 124 selects a work queue for processing, scheduler thread 124 may reset the work queue pointer to reference a beginning element in the selected work queue. Accordingly, scheduler thread 124 may perform a minimal amount of work in order to reset the scheduling of tasks. Additionally, the impact in terms of memory activity is minimal. For example, it may be unnecessary to move tasks that are queued in a work queue to reinitialize the work queue.

As discussed above, for work queue 134A, the result of applying the modulo operation with the execution period of one second and obtained current value "0:00:05" as operands is zero. Additionally, for work queue 134B, the result of applying the modulo operation with the execution period of five seconds and obtained current value "0:00:05" as operands is zero. Accordingly, when current value 202 is "0:00:05", scheduler thread 124 selects both work queue 134A and work queue 134B and resets the work queue pointers associated with the selected work queues to reference the beginning element in the selected work queues.

Figure 2A:
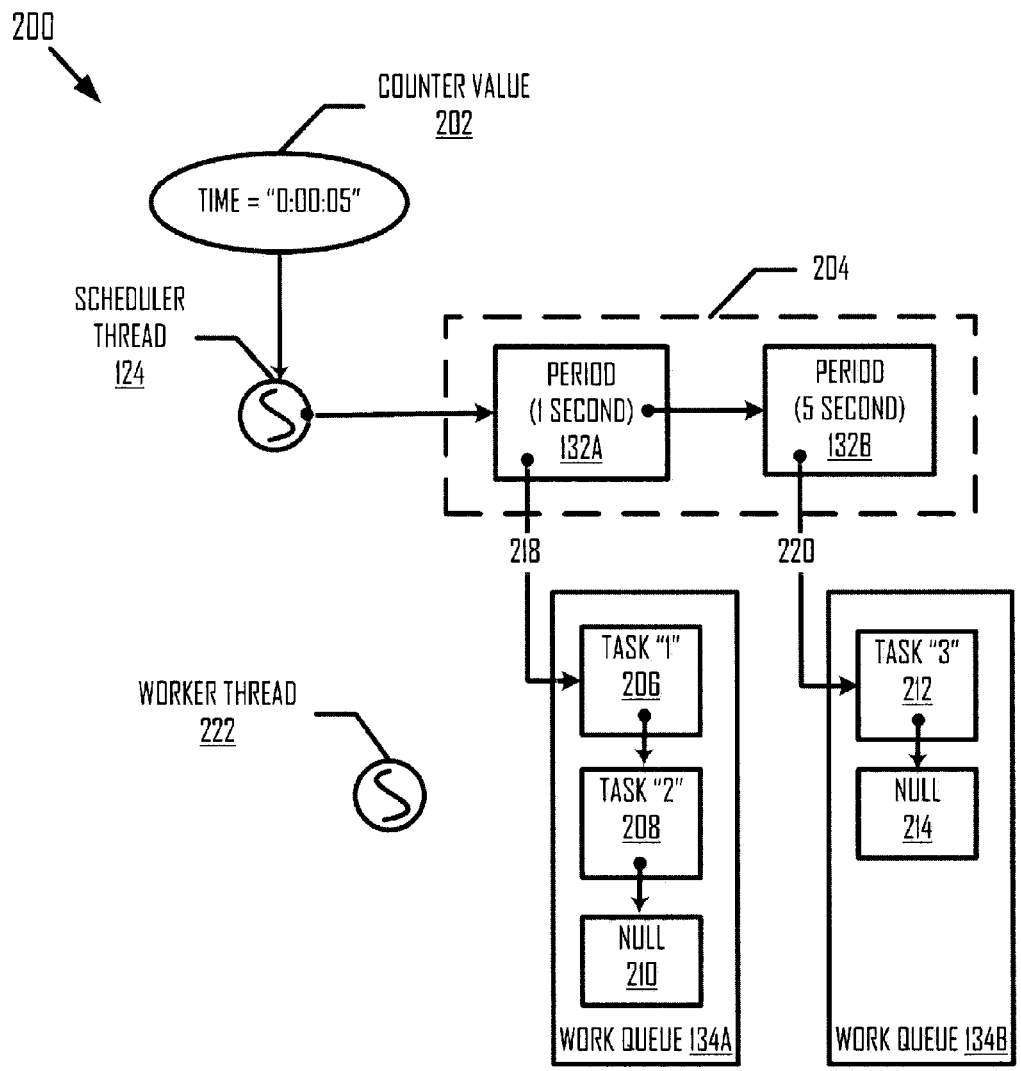
FIGS. 2A-2E are block diagrams of a worker thread processing a plurality of scheduled tasks, according to an embodiment.
Figure 2B:
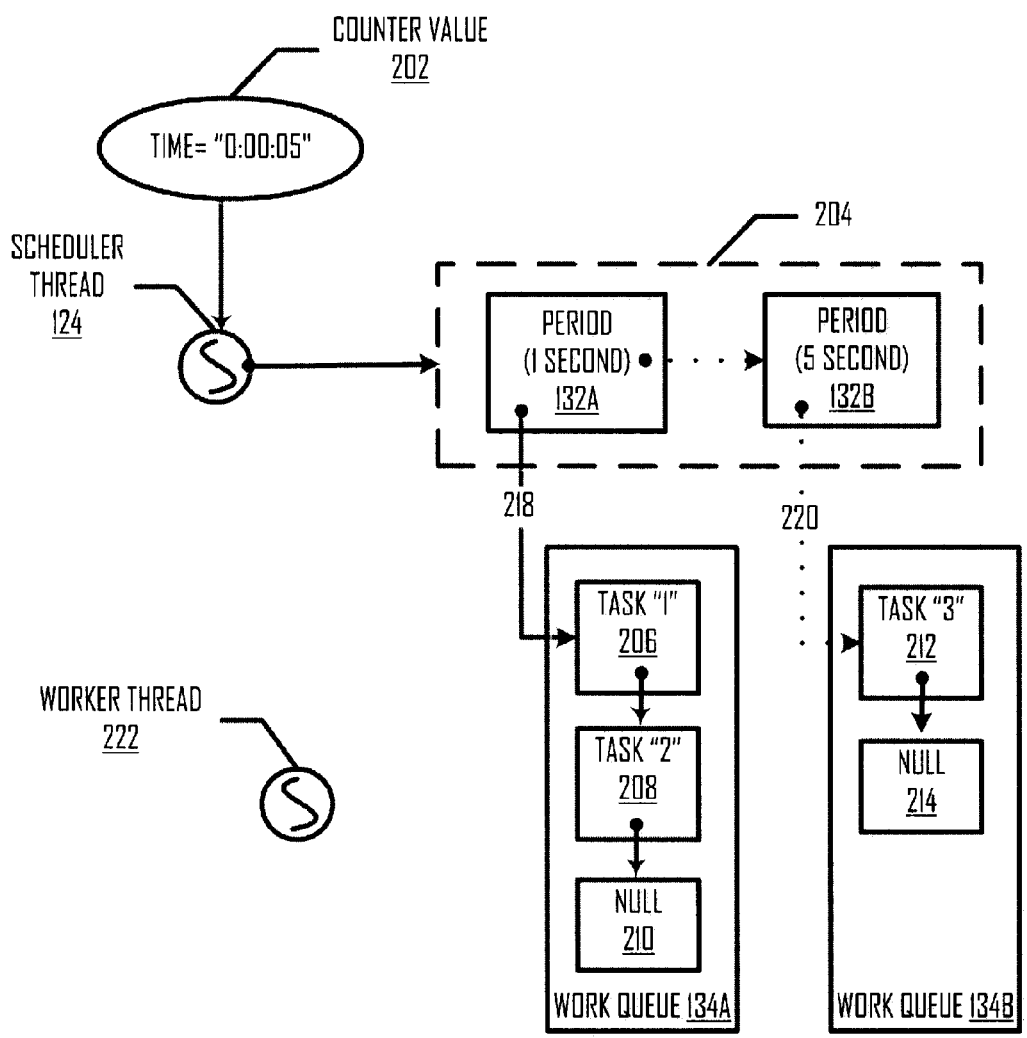

FIG. 2B is a block diagram of work queue pointers associated with selected work queues 134A and 134B being reset, according to an embodiment. In FIG. 2B, scheduler thread 124 obtains counter value 202 of "0:00:05", and scheduler thread 124 resets the work queue pointer associated with selected work queues 134A and 134B to reference a beginning element in the work queues. For example, in FIG. 2B, scheduler thread 124 may reset work queue pointer 218 to reference beginning element 206 (task "1") in work queue 134A, and work queue pointer 220 may reset work queue pointer 220 to reference beginning element 212 (task "3") in work queue 134B.

E. Execute the Scheduled Tasks

Scheduler thread 124 may send a signal to one or more worker threads to wake up and process work from the work queues. Worker thread 222 traverses linked list 204 based on an order of the period nodes in linked list 204 to determine whether tasks are scheduled for execution. For example, worker thread 222 may traverse linked list 204 by traversing period node 132A and then traversing period node 132B. In this way, worker thread 222 may process the selected work queues in an order based on linked list 204 and process tasks that are assigned faster execution frequencies before tasks that are assigned slower execution frequencies.

For each traversed period node in linked list 204, worker thread 222 reads the work queue pointer included in the traversed period node and determines whether the period node's work queue pointer references a null value. In response to determining that the period node's work queue pointer references the null value, worker thread 222 may move on to the next period node in linked list 204 and determine whether the next period node's work queue pointer references the null value. In contrast, in response to determining that a period node's work queue pointer does not reference a null value in a work queue, worker thread 222 may process a current task referenced by the work queue pointer and modify the work queue pointer to reference the next task after the current task in the work queue. If the current task is the last task in the work queue, worker thread 222 may modify the work queue pointer to reference a null value. Accordingly, worker thread 222 may process the set of tasks in a work queue based on the order of the tasks in the work queue and may continue to traverse linked list 204 until the last period node in linked list 204 is traversed. In an example, worker thread 222 may lock data in a period node to advance the work queue pointer referenced by the period node. The critical section of the lock may be tiny as it may only need to copy the next pointer of a task to the work queue pointer. Accordingly, the design may be scalable to a large number of worker threads.

Worker thread 222 processes tasks queued in the selected work queues based on an ascending order that is laid out in linked list 204. By traversing linked list 204 in order from the beginning to the last element, worker thread 222 sequentially processes tasks that are assigned the faster execution frequency to the slower execution frequency in the selected subset of work queues. In the example illustrated in FIG. 2B, although both work queues 134A and 134B may be selected for processing, worker thread 222 may process tasks queued in work queue 134A before processing tasks queued in work queue 134B.

Work queue 134A has the lowest execution frequency in the selected subset because the execution frequency of work queue 134A is lower than the execution frequency of work queue 134B. Each of the tasks queued in work queue 134A executes once within a one-second time period. Thus at the end of the period for work queue 134A (every second), scheduler thread 124 resets work queue pointer 118 to reference the beginning element in work queue 134A. Similarly, each of the tasks queued in work queue 134B executes once within a five-second time period. Thus at the end of the period for work queue 134B (every five seconds), second scheduler thread 124 resets work queue pointer 120 to reference the beginning element in work queue 134B.

If time is left over after processing the tasks in work queue 134A, worker thread 222 processes the tasks in work queue 134B. As indicated in FIG. 2B, reference 218 from period node 132A to work queue 134A is illustrated as being a solid line, which indicates that worker thread 222 is processing work queue 134A. In contrast, reference 220 from period node 132B to work queue 134B is illustrated as being a dashed line, which indicates that worker thread 222 is not processing work queue 134B.

In reference to FIG. 2B, worker thread 222 traverses period node 132A and reads work queue pointer 218, which references element 206 and does not reference a null value. In response to determining that work queue pointer 218 does not reference a null value in work queue 134A, worker thread 222 processes the set of tasks in work queue 134A based on the order of the queued tasks. For example, worker thread 222 retrieves and processes the current task "1", which is included in element 206 and referenced by work queue pointer 218.

Figure 3B:
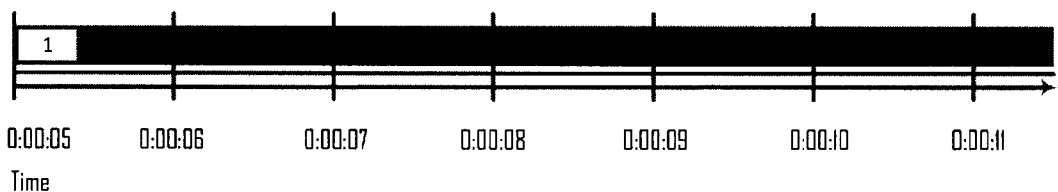

FIG. 3B is a timing diagram for worker thread 222 corresponding to FIG. 2B and the processing of task "1" between the time period "0:00:05" and "0:00:06". Task "1" is assigned an execution period of one second and thus scheduler thread 124 schedules task "1" to execute every second. FIG. 3B shows the activities of scheduler thread 124 and worker thread 222 in relation to this time period. Scheduler thread 124 may schedule task "1" for execution during the time period "0:00:05" to "0:00:06", and worker thread 222 initiates processing of task "1" during the one-second time period "0:00:05" to "0:00:06". Accordingly, worker thread 222 processes task "1" during the allotted time period of one second.

Worker thread 222 may modify work queue pointer 218 to reference a next element 208 after element 206 in work queue 134A. For example, worker thread 222 modifies work queue pointer 218 to reference element 208, which includes task "2". In reference to FIG. 2C, worker thread 222 reads work queue pointer 218, which references element 208 and does not reference a null value. In response to determining that work queue pointer 218 does not reference a null value in work queue 134A, worker thread 222 retrieves and processes the current task "2", which is included in element 208 and referenced by work queue pointer 218.

Figure 2C:
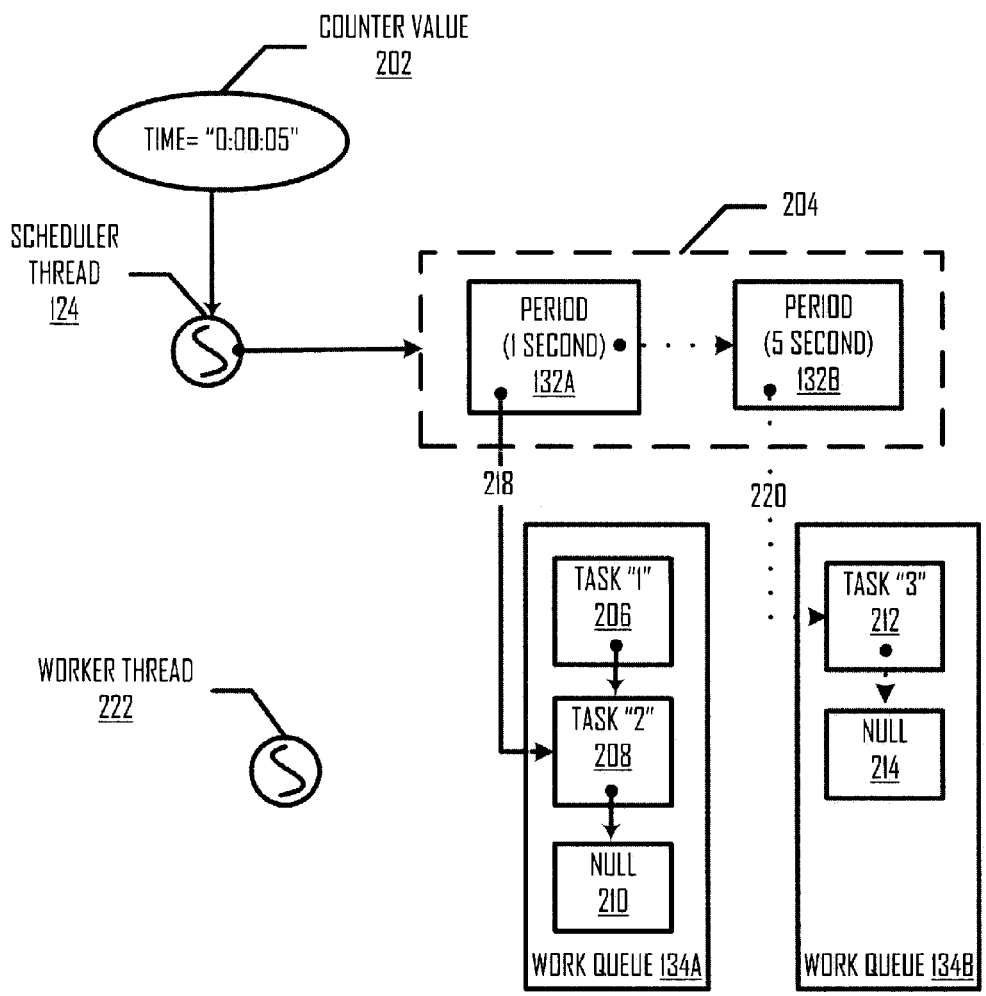
Figure 3C:
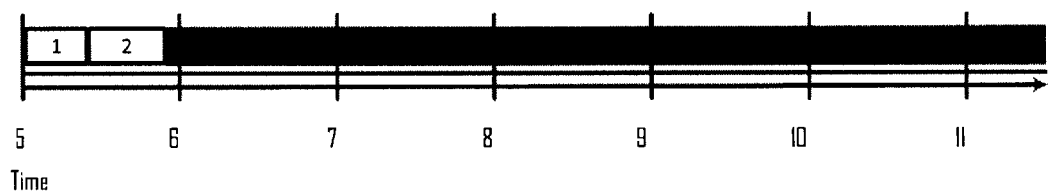

FIG. 3C is a timing diagram for worker thread 222 corresponding to FIG. 2C and the processing of task "2" between the time period "0:00:05" and "0:00:06". Task "2" is assigned an execution period of one second and thus scheduler thread 124 schedules task "1" to execute every second. FIG. 3C shows the activities of scheduler thread 124 and worker thread 222 in relation to this time period. Scheduler thread 124 may schedule task "2" for execution during the time period "0:00:05" to "0:00:06", and worker thread 222 initiates processing of task "2" during the one-second time period "0:00:05" to "0:00:06". Accordingly, worker thread 222 processes tasks "1" and "2" during the allotted time period of one second.

Worker thread 222 may modify work queue pointer 218 to reference next element 210 after element 208 in work queue 134A. For example, worker thread 222 modifies work queue pointer 218 to reference element 210, which includes the null value. In response to determining that work queue pointer 218 references a null value in work queue 134A, worker thread 222 may determine that it is finished processing work queue 134A and may traverse the next period node in linked list 204. Accordingly, priority is given to the tasks based on the their assigned execution periods or assigned execution frequencies. For example, worker thread 222 processes the tasks that are assigned an execution period of one second before processing tasks that are assigned an execution period longer than one second. Additionally, worker thread 222 may execute the tasks as soon as possible. For example, worker thread 222 after worker thread 222 has processed tasks "1" and "2", worker thread 222 may initiate the processing of task "3" as soon worker thread 222 can.

Figure 2D:
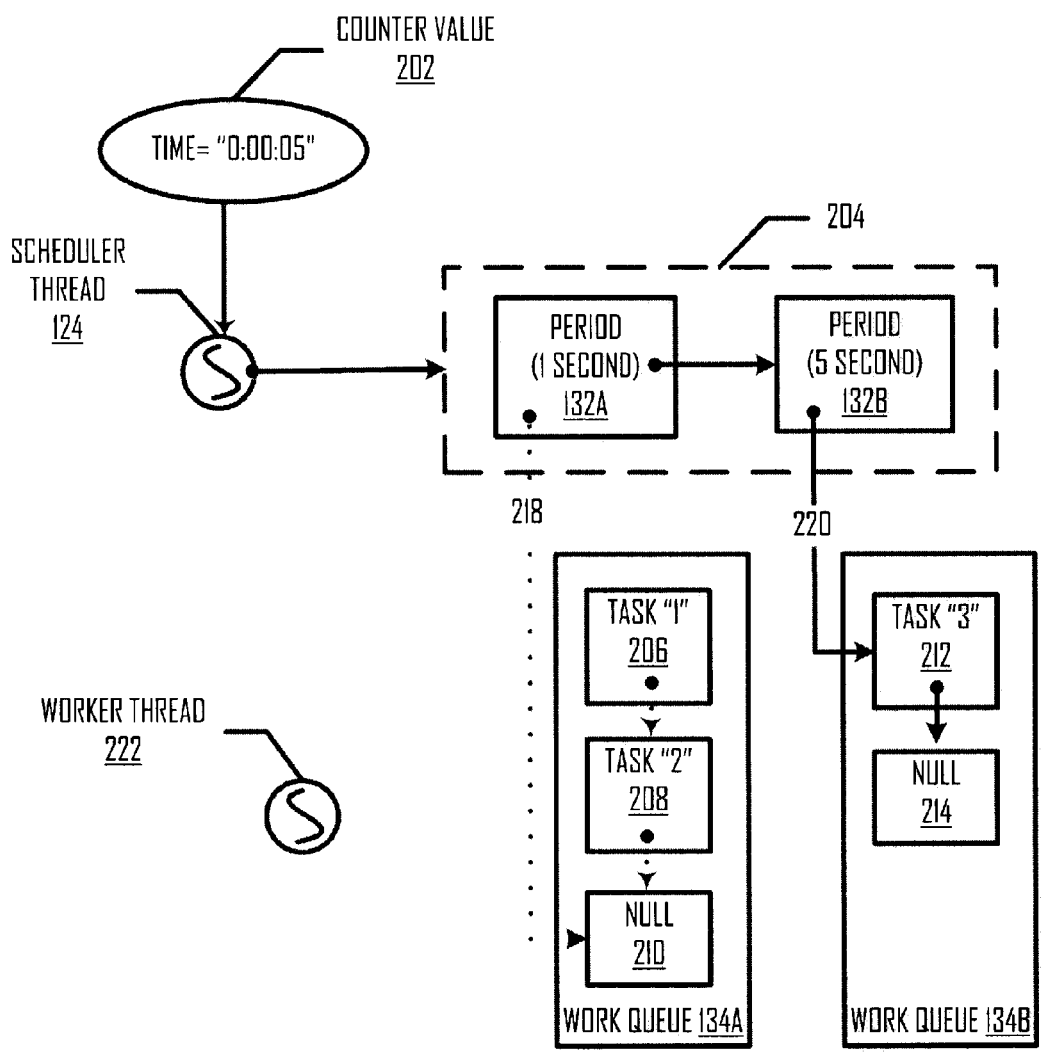

In reference to FIG. 2D, worker thread 222 may traverse period node 132B, which is the next period node after period node 132A in linked list 204. Period node 132B has an execution period of five seconds and includes work queue pointer 220, which references work queue 134B. Worker thread 222 may process work queue 134B by performing actions similar to the actions described in relation to work queue 134A above. For example, in response to determining that work queue pointer 220 does not reference a null value in work queue 134B, worker thread 222 processes the set of tasks in work queue 134B based on the order of the queued tasks. For example, worker thread 222 retrieves and processes the current task "3", which is included in element 212 and referenced by work queue pointer 220.

Figure 3D:
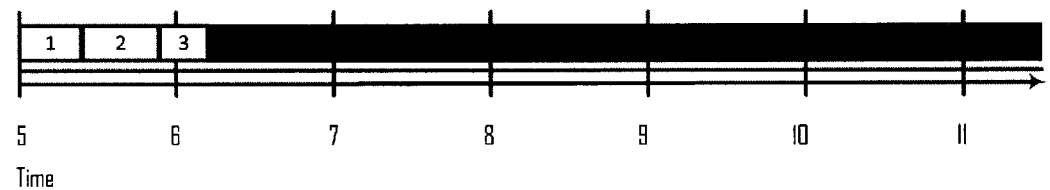

FIG. 3D is a timing diagram for worker thread 222 corresponding to FIG. 2D and the processing of task "3" between the time period "0:00:05" and "0:00:10". Task "3" is assigned an execution period of five seconds and thus scheduler thread 124 schedules task "3" to execute every five seconds. FIG. 3D shows the activities of scheduler thread 124 and worker thread 222 in relation to this time period. Scheduler thread 124 may schedule task "3" for execution during the time period "0:00:05" to "0:00:10". Worker thread 222 initiates processing of task "3" during the five-second time period "0:00:05" to "0:00:10" because there is spare time and worker thread 222 has finished processed tasks "1" and "2". Accordingly, worker thread 222 processes task "3" during the allotted time period of five seconds.

Figure 2E:
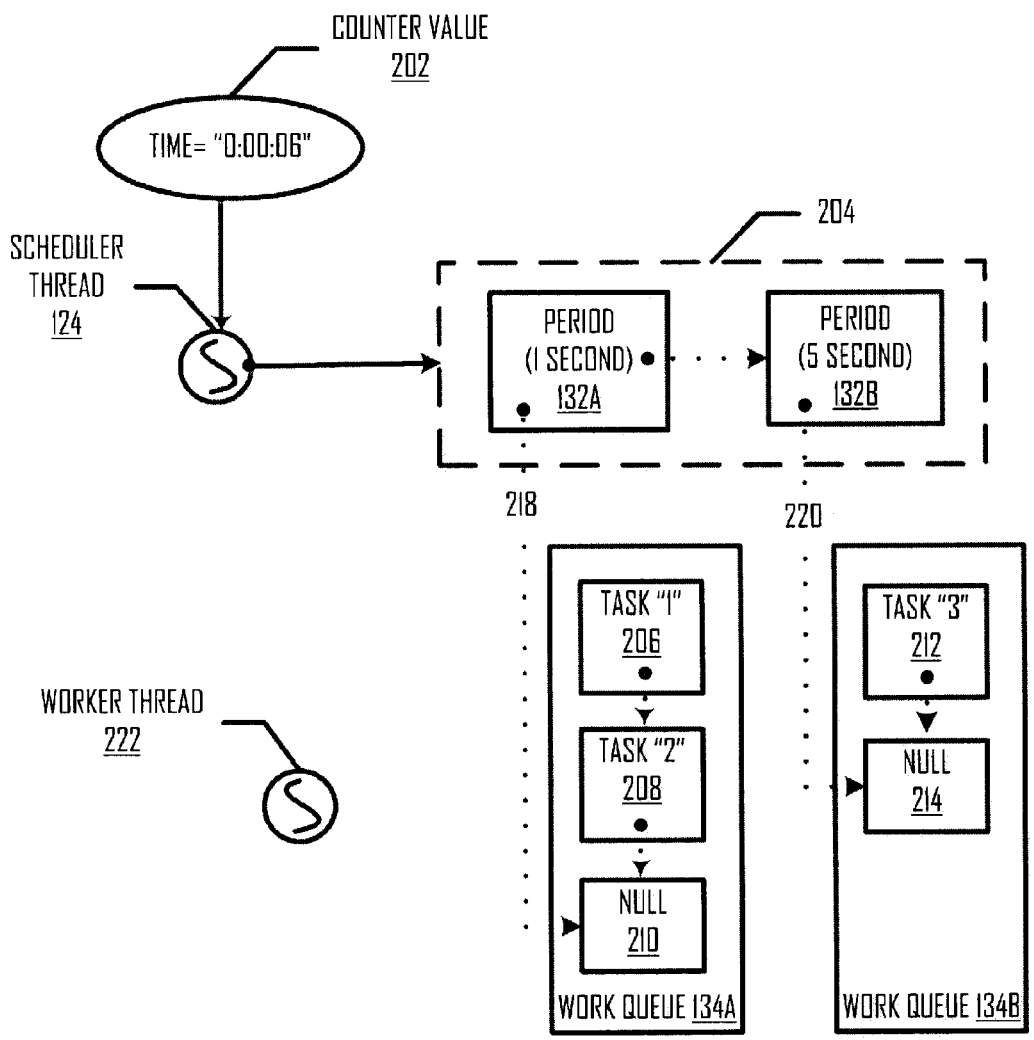

Worker thread 222 may modify work queue pointer 220 to reference a next element 214 after element 212 in work queue 134B. For example, worker thread 222 modifies work queue pointer 220 to reference element 212, which includes the null value. Accordingly, scheduler thread 124 is finished with processing work queue 134B and is finished traversing linked list 204. As indicated in FIG. 2E, reference 218 from period node 132A to work queue 134A is illustrated as being a dashed line, and reference 220 from period node 132B to work queue 134B is illustrated as being a dashed line. The dashed lines indicate that worker thread 222 is done processing work queues 134A and 134B. When the tasks queued in the selected work queues have been processed, worker thread 222 may go to sleep. The work is finished until scheduler thread 124 wakes up again and resets one or more work queue pointers to reference a beginning element in a work queue.

In response to selecting work queue 134A at a future point in time (e.g., at time "0:00:06", "0:00:07", "0:00:08", etc.), scheduler thread 124 may reset work queue pointer 218 to reference beginning element 206 in work queue 134A. Similarly, in response to selecting work queue 134B at a future point in time (e.g., at time "0:00:10", "0:00:15", "0:00:20", etc.), scheduler thread 124 may reset work queue pointer 220 to reference beginning element 212 in work queue 134B.

Figure 4:
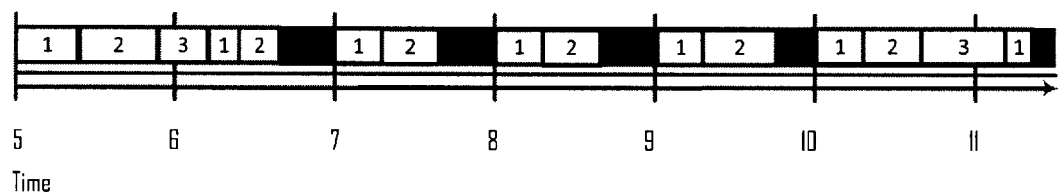
FIG. 4 is a timing diagram for the worker thread corresponding to the processing of work queues, according to an embodiment.

FIG. 4 is a timing diagram for worker thread 222 corresponding to the processing of work queues 134A and 134B between a time period "0:00:05" and "0:00:11", according to an embodiment. FIG. 4 shows the activities of scheduler thread 124 and worker thread 222 in relation to this time period. The initiation of the processing of tasks "1", "2", and "3" during time periods "0:00:05" and "0:00:06" is discussed above. When counter value 202 is "0:00:06", "0:00:07", "0:00:08", "0:00:09", "0:00:10", and "0:00:11", scheduler thread 124 may reset work queue pointer 218 to reference beginning element 206 in work queue 134A.

In FIG. 4, for the time period between "0:00:06" and "0:00:7", scheduler thread 124 may select work queue 134A and schedule tasks "1" and "2" for execution during the time period "0:00:06" and "0:00:07". Worker thread 222 initiates processing of tasks "1" and "2" during the one-second time period "0:00:06" and "0:00:07" and processes tasks "1" and "2" during the allotted time period of one second. This applies to the one-second time periods "0:00:07" to "0:00:08", "0:00:08" to "0:00:09", and "0:00:09" to "0:00:10".

Further, when counter value 202 is "0:00:10", scheduler thread 124 may reset work queue pointer 218 to reference beginning element 206 in work queue 134A and may reset work queue pointer 220 to reference beginning element 212 in work queue 134B. For the time period between "0:00:10" and "0:00:11", scheduler thread 124 may select work queues 134A and 134B. As such, scheduler thread 124 schedules tasks "1" and "2" for execution during the time period "0:00:10" and "0:00:11" (abides by the one-second period) and also schedules task "3" for execution during the time period "0:00:10" and "0:00:15" (abides by the five-second period). Worker thread 222 initiates processing of tasks "1" and "2" during the one-second time period "0:00:10" and "0:00:11" and processes tasks "1" and "2" during the allotted time period of one second. After tasks "1" and "2" are processed, worker thread 222 initiates processing of task "3" during the five-second time period "0:00:10" and "0:00:15" and processes task "3" during the allotted time period of five seconds.

As discussed above and further emphasized here, FIGS. 1, 2A-2E, 3A-3D, and 4 are merely examples, which should not unduly limit the scope of the claims. For example, although a work queue pointer is described as referencing a null value, this is not intended to be limiting. In another example, the work queue pointers may be initialized to reference a value different from the null value.

IV. Flexibility

A. Error Handling

When a user schedules a set of tasks at a given frequency, it is expected the user knows all of them can be run in the allotted duration. A task, however may run for an unknown duration, and there is no guarantee that the tasks assigned to an execution period will be executed within the time period, hence the need to handle this error case. In an example, scheduler thread 124 may wake up and decide that the work queue for a particular period should be reset. Scheduler thread 124 sees that the work queue pointer is null, indicating that all tasks were run on time. However, it may notice that the work queue is not empty. For example, scheduler thread 124 may determine that a scheduled task queued in a selected work queue has not executed in accordance with the execution period assigned to the scheduled task. In such a scenario, the user may be informed that the failed task did not run because the tasks scheduled are too slow, and may change the configuration so that the tasks run faster or at a slower frequency. In an embodiment, in response to determining that the scheduled task has not executed in accordance with the execution period assigned to the scheduled task, scheduler thread 124 may decide after warning the user not to run the scheduled task and reset the work queue.

In another embodiment, in response to determining that the scheduled task has not executed in accordance with the execution period assigned to the scheduled task, scheduler thread 124 may postpone the resetting of the work queue pointer to the next iteration and raise an error. In an example, scheduler thread 124 may trigger an error that it records and may keep the work queue as is and not modify the associated work queue pointer. In such an example, the error is a correctable error and scheduler thread 124 avoids resetting the work queue pointer. Scheduler thread 124 may extend the execution period by, for example, doubling the execution period once and allowing the rest of the work for that period to complete. Loss of data, however, may occur because the tasks of that period are run only once over these two period iterations. In an example, if scheduler thread 124 determines that task "3" has not executed between time period "0:00:10" and "0:00:15", then scheduler thread 124 may determine that task "3" has not executed in accordance with its assigned execution period. In such an example, scheduler thread 124 may double the execution period to ten seconds to allow task "3" to execute between time period "0:00:10" and "0:00:20". Although scheduler thread 124 is described as doubling the period, scheduler thread 124 may extend the period in a different amount (e.g., tripling the period).

In order to ensure forward progress for all the periods, an embodiment may implement a maximum duty cycle for a given period. The duty cycle is the ratio of time of a period used to process the work queue of that period versus the spare time available. Enforcing a duty cycle strictly less than a 100% gives time for slower periods to run their tasks to complete in time.

B. Flexible Traversals

Additionally, although one worker thread (e.g., worker thread 222) is described as traversing the period nodes and work queues, this is not intended to be limiting and more than one worker thread 222 may traverse the period nodes and work queues. Moreover, a worker thread may traverse the period nodes and work queues using a different traversal pattern than that described above. The traversal technique described above may be referred to as a regular depth first scheduling traversal. Scheduling heuristics may be flexible, and a combination of different traversal techniques may be employed on the period nodes and/or work queues to change the scheduling heuristics and priorities of tasks. Further, different worker threads may perform different traversals of the work queues to implement different behaviors and avoid symptomatic unfair corner case behaviors of scheduler thread 124.

For example, a reverse traversal may be implemented by some worker threads. In reverse traversal, one or more worker threads may scan the period nodes from the longest execution period to the shortest execution period. Accordingly, the reverse traversal may be used for one or more worker threads to avoid starvation and excessive delay on tasks that are assigned a longer execution period compared to other tasks.

In another example, a breadth-first traversal may be implemented by some worker threads. In breadth-first traversal, one or more worker thread may scan the period nodes and process a task that is referenced by each period node. For example, in relation to FIG. 2A, worker thread 222 may process task "1" queued in work queue 134A, process task "3" queued in work queue 134B, and then process task "2" queued in work queue 134A. Accordingly, the breadth-first traversal may be used for one or more worker threads to ensure that a task queued in each work queue is processed and provide relief for all tasks in all periods in this example.

In an embodiment, two work queues may be used for tasks that are assigned to the same execution period. In an example, scheduler thread 124 manages a work queue where work items either can run fast or can be scheduled in multiple times to perform part of the work. Scheduler thread 124 inserts partially completed tasks into a separate partial work queue. A period node has a first reference to the regular work queue and a second reference to the partial work queue. A partial work queue may provide a solution for breaking up a large task into smaller partial tasks and stores partially completed tasks. A partial task may be prioritized lower than regular tasks of the period, but higher than a task of any other larger/slower period. If a task does not complete, scheduler thread 124 may insert the partially completed task into a partial work queue. A worker thread may scan the partial work queue after the regular work queue is cleared and processed (e.g., using the regular depth first approach). Accordingly, the use of a partial work queue may ensure fairness for the tasks of the period. Splitting long work gives a chance to quick tasks to run to completion before the period is over. The partial work queue can empty in time, but if it does not, the period can be extended and the partial work queue can finish processing, or not be extended and the slow work is penalized.

In another example, work queues referenced by a period node can be split into a separate work that runs in an exempt domain from those holding a domain lock. In another example, multiple prioritized work queues per period are managed. The multiple prioritized work queues may be traversed differently, where each work queue may have distinct tasks instead of pointing to the same tasks.

Moreover, although the modulo operation is described as being the operation to apply to determine whether to select a work queue for processing, other operations may be used. In an example, periods are inclusive of each other, meaning that if a period is not a multiple of the current value obtained from the counter (e.g., time since boot), any longer period tracked will not be a multiple of the counter value either. For example, at current value 202 of 0:00:05, schedule may select work queue 134A (defined by execution period of "0:00:01"), and work queue 134B (defined by execution period of "0:00:05"). If linked list 204 were to include a period node having a 10-second execution period, however, the work queue referenced by this period node would not be selected and the other larger periods do not need to be checked.

C. Period Node and Work Queue Implementations

Additionally, period nodes and work queues are described as being implemented using linked list. This is not intended to be limiting and period nodes and work queues may be implemented using different data structures. In an example, a work queue is implemented using an array, and a work queue of the selected subset of work queues includes an ordered set of tasks stored in the array. When a work queue is implemented using an array, a current index of the array is tracked. Using arrays may have an added bonus of it being unnecessary to use locks to manipulate the work queue pointer as atomic increment operations can be used instead since the jump distance is a known constant, instead of a next pointer that is read first from the current task. For one or more worker threads, a worker thread may traverse a data structure including a plurality of period nodes (e.g., linked list 204), where each node includes a work queue pointer that references a work queue of the plurality of work queues.

For a traversed period node in the data structure, the worker thread may identify a current index of work queue and determine whether the current index of the work queue is less than a length of the work queue. In response to determining that the current index of the work queue is less than the length of the work queue, the worker thread may process a current task stored at the current index of the work queue and incrementing the current index of the work queue. In contrast, in response to determining that the current index of the work queue is not less than the length of the work queue, the worker thread may traverse a second node (e.g., period node 132B) after the first traversed node (e.g., period node 132A) in the data structure (e.g., linked list 204) and determine whether the second work queue pointer references a first value in the work queue. In response to determining that the current index of the second work queue is less than the length of the second work queue, the worker thread processes a current task stored at the current index of the second work queue and increments the current index of the second work queue. In an embodiment, for each work queue of the plurality of work queues, scheduler thread 124 determines a result of applying an operation as described above and in response to the result being a first value, scheduler thread 124 reset the current index of the respective queue to zero. Additionally, worker thread 222 may use a fetchadd atomic operation rather a lock if the tasks are stored in an array.

Additionally, data structures different from that described may be used to implement the period nodes and work queues. Moreover, work queues of the plurality of work queues may be implemented using different data structures. For example, in another embodiment, work queue 134A may be implemented using a linked list and work queue 134B may be implemented using an array.

V. Example Method

Figure 5:
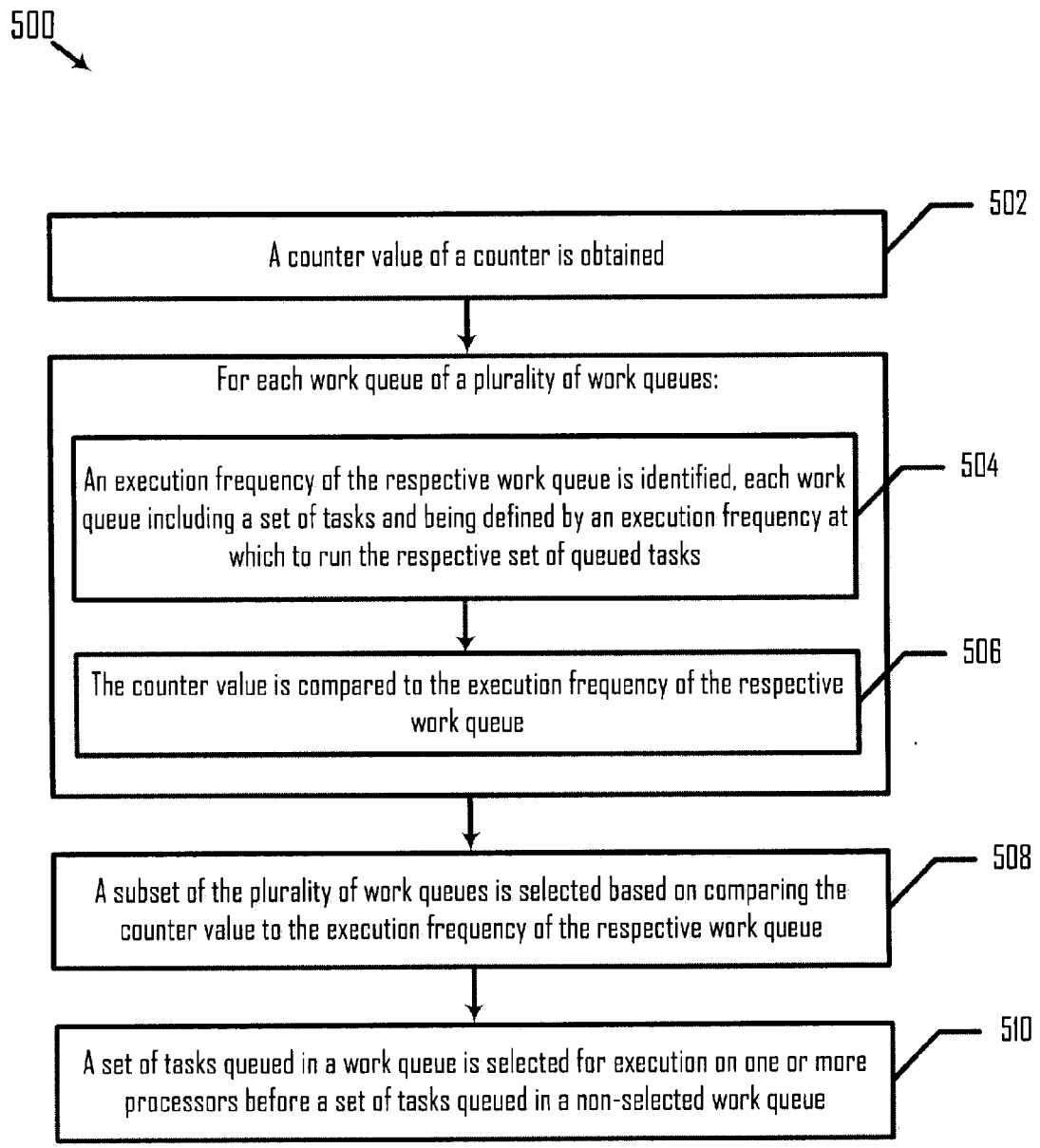
FIG. 5 is a flowchart illustrating a method of scheduling a plurality of tasks for execution on one or more processors, according to an embodiment.

FIG. 5 is a flowchart illustrating a method 500 of scheduling a plurality of tasks for execution on one or more processors, according to an embodiment. Referring back to FIG. 1, operating system 120 may perform the operations in method 500. For example, operating system 120 may spawn threads that perform the operations in method 500. Computer systems may benefit from the teachings in the disclosure. For example, a task may be assigned an execution period and may be placed in a work queue that is defined by the execution period. The execution period that is assigned to the task may be based on factors such as how often particular performance statistics should be requested from the system. For example, a first task may invoke an API at a physical storage drive to obtain the time taken to fetch data, and a second task may invoke an API at the physical storage drive to obtain software counters that track errors at network connections. A user may determine that the first task should be invoked every second and that the second task should be invoked every five seconds. Accordingly, the first task may be placed in work queue 134A, and the second task may be placed in work queue 134B. Method 500 is not meant to be limiting and may be used in other applications.

Method 500 includes blocks 502-510. In a block 502, a counter value of a counter is obtained. In an example, scheduler thread 124 obtains counter value 202 of a counter. Counter value 202, for example, may be the time of day.

For each work queue of a plurality of work queues, blocks 504 and 506 may be performed. In block 504, an execution period of the respective work queue is identified, each work queue including a set of tasks and being defined by an execution period at which to run the respective set of queued tasks. In an example, scheduler thread 124 identifies an execution period of work queue 134A, each work queue including a set of tasks and being defined by an execution period of one second at which to run the respective set of queued tasks. In block 506, the counter value is compared to the execution period of the respective work queue. In an example, scheduler thread 124 compares an obtained counter value "0:00:05" to the one-second execution period of work queue 134A.

In a block 508, a subset of the plurality of work queues is selected based on comparing the counter value to the execution period of the respective work queue. In an example, scheduler thread 124 selects, comparing the counter value "0:00:05" to the one-second execution period of work queue 134A, a subset of the plurality of work queues. Scheduler thread 124 may, for example, apply a modulo operation having the counter value and execution period of the respective work queue as operands.

In a block 510, a set of tasks queued in a work queue is selected for execution on one or more processors before a set of tasks queued in a non-selected work queue. In an example, scheduler thread 124 schedules a set of tasks queued in selected work queue 134A for execution on one or more processors before a set of tasks queued in non-selected work queue 134B. In such an example, scheduler thread 124 may reset the work queue pointer associated with the selected work queue to reference the first task in the selected work queue pointer and not reset the work queue pointer associated with the non-selected work queue.

It is understood that additional processes may be performed before, during, or after blocks 502-510 discussed above. It is also understood that one or more of the blocks of method 500 described herein may be omitted, combined, or performed in a different sequence as desired.

An example of an embodiment is the scheduling of real-time threads on processors of a computing system. The scheduler thread may run on any processor, awakened by a timer interrupt to reset as described for the work queues. When a processor is idle, the scheduler thread extracts the next real-time task to run from the work queues, and runs it until the thread yields the CPU again, or is preempted by the processor's timer timeout, in which case the task is moved to the partial work queue for further processing if there is time in the period. In case a thread consumes too much CPU time between sleeps, an error may be raised, and the thread may be killed and removed from the work queue.

VI. Example Computing System

Figure 6:
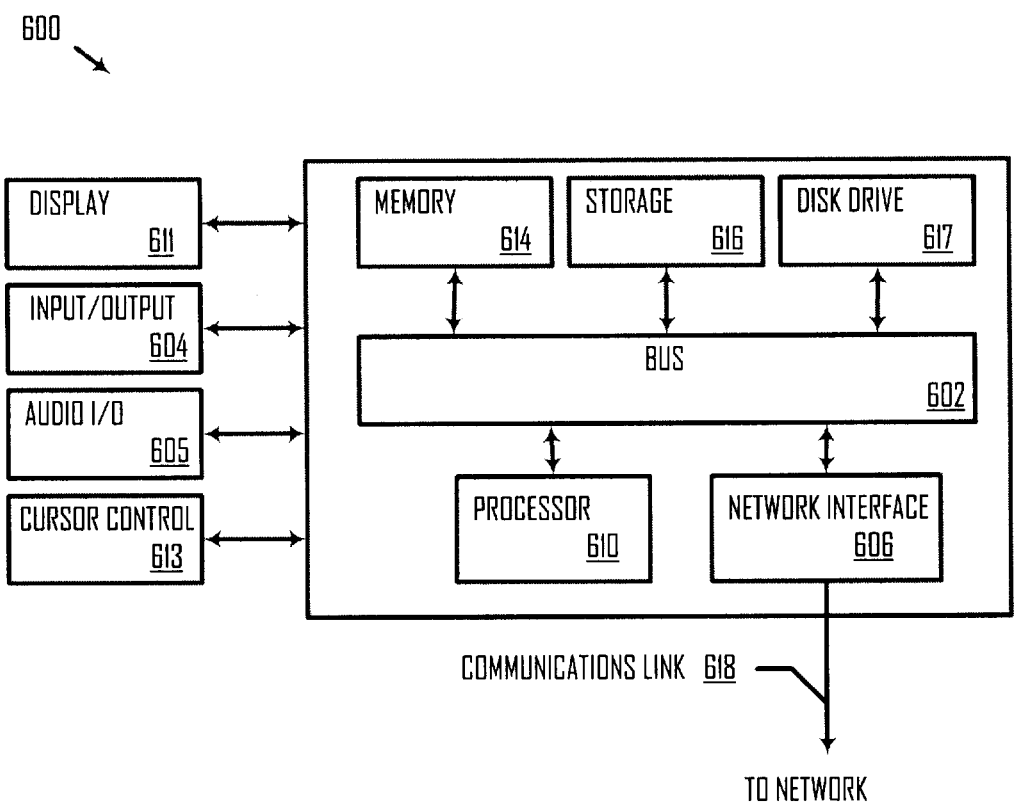
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computing device 102 may include a client or a server computing device that includes one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.).

An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. Processor 610, which may be a micro-controller, digital signal processor (DSP), or other processing component, processes these various signals, such as for display on display 611 coupled to computer system 600 or transmission to other devices via communication link 618. Processor 610 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 610 and other components by executing one or more sequences of instructions contained in system memory component 614. Logic may be encoded in a computer readable medium, which may refer to any medium that participates in providing instructions to processor 610 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 500) to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Moreover, computing device 102 may be coupled over a network. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various blocks or actions described herein may be changed, combined into composite blocks or actions, and/or separated into sub-blocks or sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of scheduling a plurality of tasks for execution on one or more processors, comprising:
   maintaining a data structure having a plurality of period nodes, where each period node references a work queue from among a plurality of work queues and each work queue includes a set of tasks and is defined by an execution period at which to run the respective set of queued tasks; wherein execution priority of each task is based on assigned execution periods and the plurality of period nodes are arranged in a hierarchical order based on the assigned execution periods;
   obtaining a counter value of a counter that indicates a time period;
   traversing the data structure to determine an execution period for each work queue of the plurality of work queues;
   comparing the counter value to an execution period of the respective work queue;
   selecting, based on the comparing, a subset of the plurality of work queues; and
   scheduling a set of tasks queued in a selected work queue for execution on one or more processors before a set of tasks queued in a non-selected work queue.

2. The method of claim 1, further including:
   for each task of a plurality of tasks:
      identifying a work queue of the plurality of work queues that matches an execution period assigned to the respective task; and
      queuing the respective task in the identified work queue.

3. The method of claim 1, wherein the comparing includes applying an operation that has the counter value and the execution period of the respective work queue as operands.

4. The method of claim 3, wherein a work queue of the selected subset includes an ordered set of tasks, the method further including:
for one or more worker threads, traversing the data structure including the plurality of period nodes, each period node including a work queue pointer that references a work queue of the plurality of work queues.

5. The method of claim 4, further including:
for a traversed period node in the data structure:
reading the work queue pointer included in the traversed period node;
determining whether the work queue pointer references a first value; and
in response to determining that the work queue pointer does not reference the first value, processing a current task referenced by the work queue pointer.

6. The method of claim 5, further including:
in response to determining that the work queue pointer does not reference the first value, modifying the work queue pointer to reference a next task in the work queue, wherein if the current task is the last task in the work queue, the modifying includes modifying the work queue pointer to reference the first value.

7. The method of claim 6, further including:
for each work queue of the plurality of work queues:
determining a result of the applying an operation; and
in response to the result being a second value, resetting a work queue pointer associated with the respective work queue to reference a beginning task of the ordered set of tasks in the respective work queue.

8. The method of claim 6, wherein the operation is a modulo operation.

9. The method of claim 1, wherein a work queue of the selected subset includes an ordered set of tasks stored in an array, the method further including:
for one or more worker threads:
traversing the data structure including the plurality of period nodes, each period node including a work queue pointer that references a work queue of the plurality of work queues; and
for a traversed period node in the data structure:
identifying a current index of the work queue referenced by the traversed period node;
determining whether the current index of the work queue is less than a length of the work queue;
in response to determining that the current index of the work queue is less than the length of the work queue:
processing a current task stored at the current index of the work queue; and
incrementing the current index of the work queue.

10. The method of claim 9, further including:
for one or more worker threads, in response to determining that the current index of the work queue is not less than the length of the work queue:
traversing a second period node after the first traversed period node in the data structure, the second period node including a second work queue pointer that references a second work queue; and
in response to determining that the current index of the work queue is less than the length of the work queue:
processing a current task stored at the current index of the second work queue; and
incrementing the current index of the second work queue.

11. The method of claim 10, wherein the comparing includes applying an operation that has the counter value and the execution period of the respective work queue as operands, the method further including:
for each work queue of the plurality of work queues:
determining a result of the applying an operation; and
in response to the result being a first value, resetting the current index of the respective queue to zero.

12. The method of claim 1, further including:
determining that a scheduled task queued in the selected work queue has not executed in accordance with the execution period assigned to the scheduled task; and
in response to determining that the scheduled task has not executed during the execution period assigned to the scheduled task, raising an error.

13. The method of claim 1, wherein the subset of the plurality of work queues includes a first work queue including a first set of tasks and the second work queue including a second set of tasks, wherein the first work queue is defined by a shorter execution period than the second work queue, and wherein the scheduling a set of tasks includes scheduling the first set of tasks queued in the first work queue before the second set of tasks queued in the second work queue for execution on the one or more processors.

14. A system comprising:
a memory containing machine readable medium comprising machine executable code having stored thereon instructions; and a processor module coupled to the memory, the processor module configured to execute the machine executable code to:
maintain a data structure having a plurality of period nodes, where each period node references a work queue from among a plurality of work queues and each work queue includes a set of tasks and is defined by an execution period at which to run the respective set of queued tasks; wherein execution priority of each task is based on assigned execution periods and the plurality of period nodes are arranged in a hierarchical order based on the assigned execution periods;
obtain a counter value of a counter that indicates a time period;
traverse the data structure to determine an execution period for each work queue of the plurality of work queues;
compare the counter value to an execution period of the respective work queue;
selecting, based on the comparing, a subset of the plurality of work queues; and
schedule a set of tasks queued in a selected work queue for execution on one or more processors before a set of tasks queued in a non-selected work queue.

15. The system of claim 14, wherein a work queue of the selected subset includes an ordered set of tasks and for one or more worker threads, the data structure including the plurality of period nodes is traversed, each node including a work queue pointer that references a work queue of the plurality of work queues.

16. The system of claim 15, wherein for a traversed period node in the data structure the work queue pointer included in the traversed period node is read; and whether the work queue pointer references a first value is determined; and when the work queue pointer does not reference the first value, a current task referenced by the work queue pointer is processed.

17. The system of claim 14, wherein the subset of the plurality of work queues includes a first work queue including a first set of tasks and the second work queue including a second set of tasks, wherein the first work queue is defined by a shorter execution period than the second work queue, and wherein the scheduling a set of tasks includes scheduling the first set of tasks queued in the first work queue before the second set of tasks queued in the second work queue for execution on the one or more processors.

18. A non-transitory, computer readable storage medium having stored thereon instructions for performing a method, comprising executable code which when executed, causes a processor to:
   maintain a data structure having a plurality of period nodes, where each period node references a work queue from among a plurality of work queues and each work queue includes a set of tasks and is defined by an execution period at which to run the respective set of queued tasks; wherein execution priority of each task is based on assigned execution periods and the plurality of period nodes are arranged in a hierarchical order based on the assigned execution periods;
   obtain a counter value of a counter that indicates a time period;
   traverse the data structure to determine an execution period for each work queue of the plurality of work queues;
   compare the counter value to an execution period of the respective work queue;
   selecting, based on the comparing, a subset of the plurality of work queues; and
   schedule a set of tasks queued in a selected work queue for execution on one or more processors before a set of tasks queued in a non-selected work queue.

19. The system of claim 18, wherein a work queue of the selected subset includes an ordered set of tasks and for one or more worker threads, the data structure including the plurality of nodes is traversed, each period node including a work queue pointer that references a work queue of the plurality of work queues.

20. The system of claim 19, wherein for a traversed period node in the data structure the work queue pointer included in the traversed period node is read; and whether the work queue pointer references a first value is determined; and when the work queue pointer does not reference the first value, a current task referenced by the work queue pointer is processed.

* * * * *